July 29, 1924.

W. H. SARGENT 1,503,135

TRUCK HAULING ATTACHMENT FOR TRACTORS

Filed Jan. 13, 1923    3 Sheets-Sheet 1

INVENTOR
William H. Sargent
BY
ATTORNEY

July 29, 1924.
W. H. SARGENT
TRUCK HAULING ATTACHMENT FOR TRACTORS
Filed Jan. 13, 1923
1,503,135
3 Sheets-Sheet 2
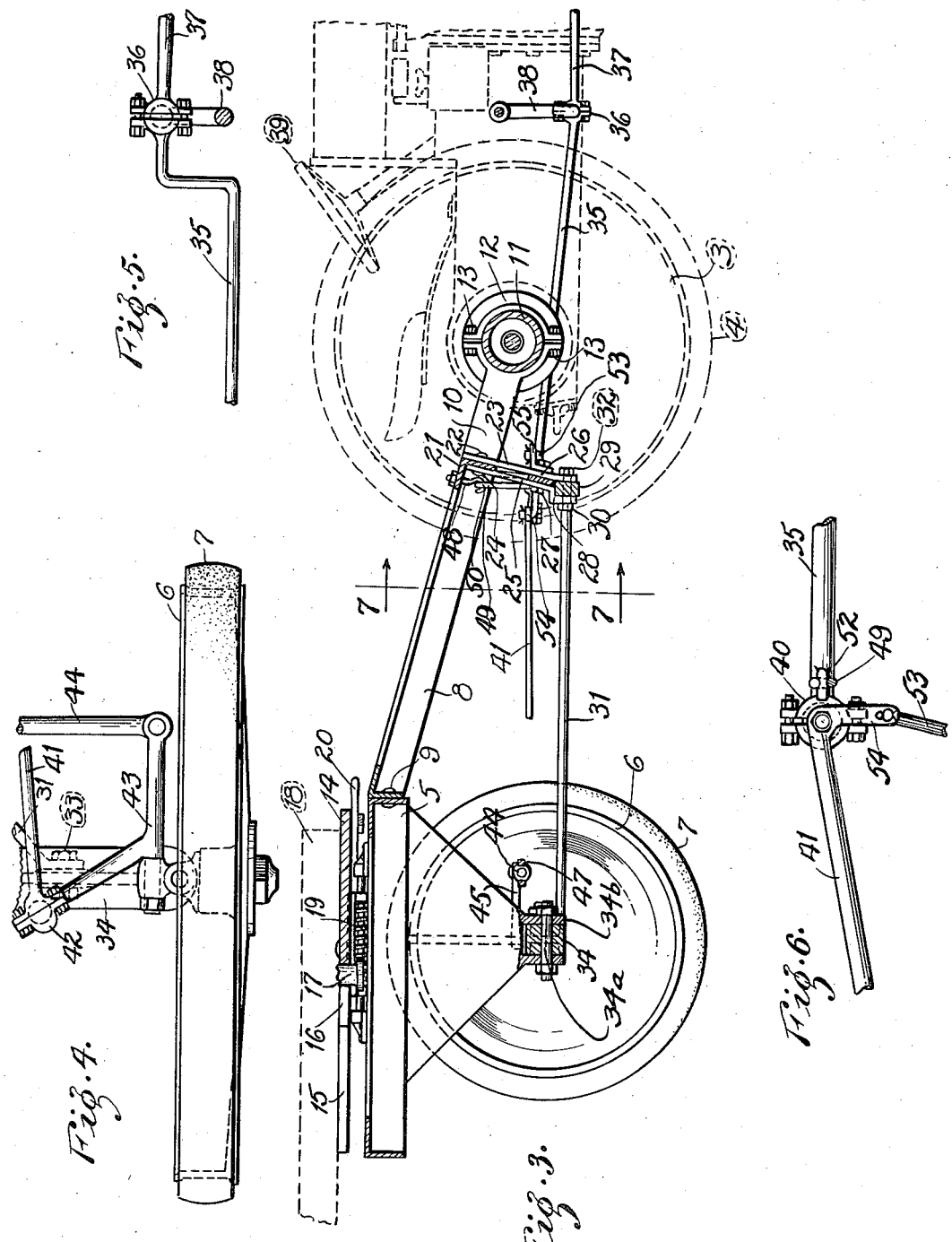
INVENTOR
William H. Sargent
BY
ATTORNEY

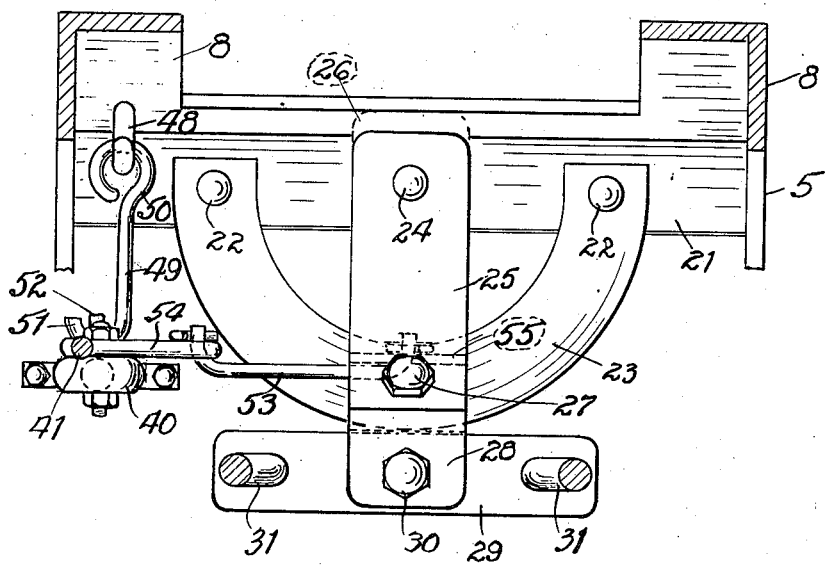

Patented July 29, 1924.

1,503,135

UNITED STATES PATENT OFFICE.

WILLIAM H. SARGENT, OF CLAYTON, MISSOURI, ASSIGNOR OF ONE-THIRD TO GEORGE RIXMANN AND ONE-THIRD TO JULIUS SEIDEL, BOTH OF ST. LOUIS, MISSOURI.

TRUCK-HAULING ATTACHMENT FOR TRACTORS.

Application filed January 13, 1923. Serial No. 612,546.

*To all whom it may concern:*

Be it known that I, WILLIAM H. SARGENT, a citizen of the United States, residing in Clayton, St. Louis County, and State of Missouri, have invented new and useful Improvements in Truck-Hauling Attachments for Tractors, of which the following is a specification.

This invention relates to trailers and has for its general object to provide means to enable a tractor to be utilized as the motive power for hauling a truck or semi-trailer.

The invention is more particularly applicable for use with tractors of the type known as Fordson tractors, made by the Ford Motor Company, although, in principle, it could be applied to other forms of tractors.

As manufactured, these tractors are limited in use almost entirely to hauling farm implements, and are equipped with iron wheels having their peripheries provided with transverse ridges to enable them to secure the necessary hold on the ground, which construction renders them unfit for passing over hard surfaced highways or streets. On the other hand, the ordinary motor driven trucks for hauling are very heavy and expensive, and, due to their relatively high cost, their use is not as general as might otherwise be the case.

In an endeavor to make possible the use of motor driven trucks for hauling without the expense attendant upon the use of the ordinary truck with a built-in motor, I conceived the idea of utilizing the relatively inexpensive Ford tractor as the motive power, and combining therewith a trailer or semi-trailer for carrying a load. For the accomplishment of this purpose, it was necessary to provide means for permitting the semi-trailer to be connected to the tractor in such a manner as to be readily detachable therefrom.

My invention, therefore, resides, first, in the provision of an auxiliary two-wheel body rigidly secured at its lower end to the rear end of the tractor proper and provided with means, such as a fifth wheel and associated lock, for enabling it to be rapidly engaged with or disengaged from the front end of a semi-trailer; second, in the provision of means for turning the wheels of the auxiliary body by manipulating the steering wheel of the tractor, and in such manner that the wheels of the tractor and the wheels of the auxiliary body will be turned in opposite directions by the steering wheel to secure the proper turning movement of the combined tractor and auxiliary body, and to enable very sharp turns to be made; third, in various novel details of construction by which the adaptation of a four-wheel tractor to the purpose in view is attained; and, finally, in the novel combination, arrangement and operation of parts characterizing the invention as a whole, as hereinafter set forth.

A preferred embodiment of my invention is illustrated in the accompanying drawings, in which—

Figure 3 is a longitudinal sectional view on an enlarged scale showing the rear portion of the tractor with my invention applied thereto;

Figure 4 is a detail view on a further enlarged scale showing the connection of the steering mechanism to one wheel of my improved auxiliary body;

Figure 5 is a detail view showing a ball and socket connection between the steering bar of the tractor proper and one end of a connecting rod leading to the steering bar of the auxiliary body;

Figure 6 is a detail view illustrating the connection between the other end of the connecting rod shown in Figure 5 and the steering bar for the wheels of the auxiliary body; and Figure 7 is a cross-sectional view taken on the line 7—7 of Figure 3 and viewed in the direction of the arrows.

Figure 1:
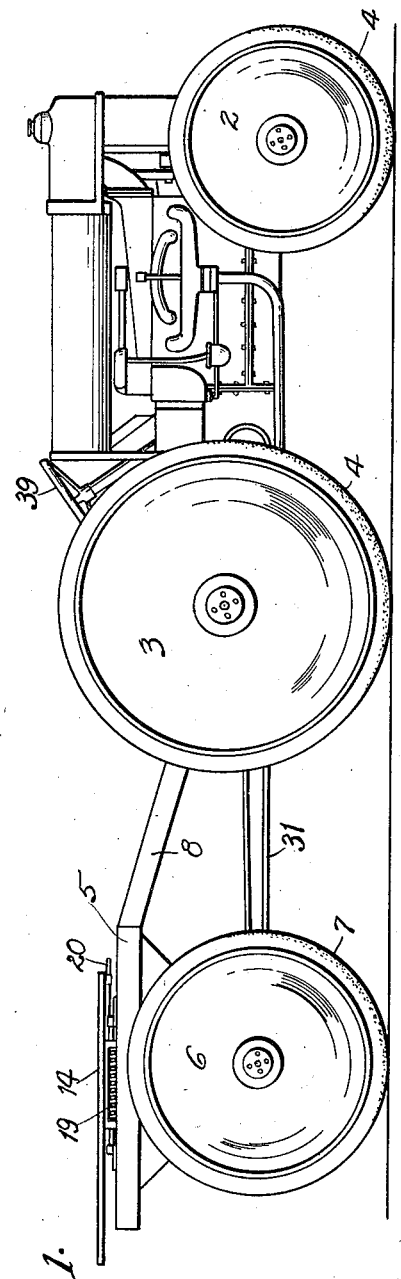
Figure 1 is a view in side elevation of a Fordson tractor having my invention applied thereto.
Figure 2:
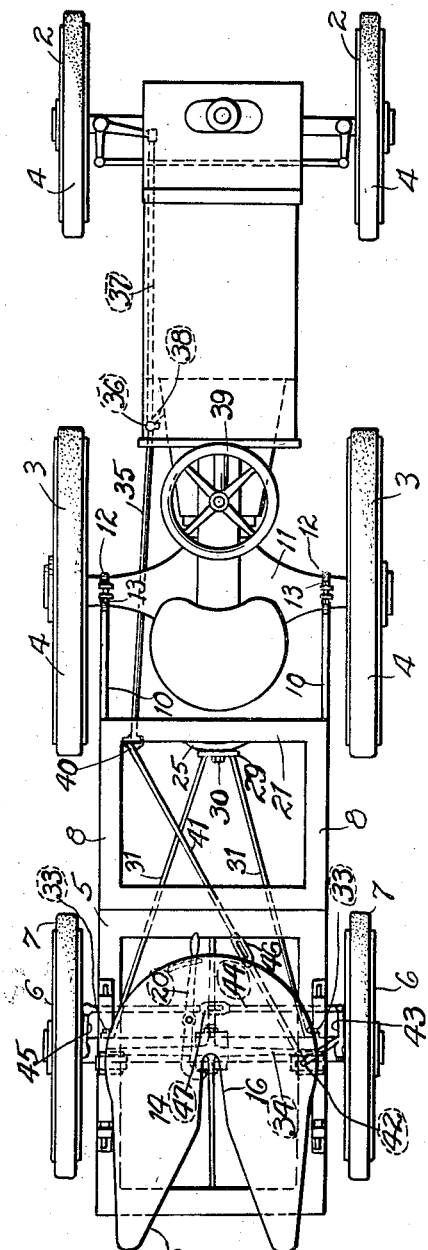
Figure 2 is a plan view of the same.

Referring now to the drawings, and particularly to Figures 1 and 2, the numeral 1 indicates generally a tractor, of the type known as the Fordson tractor made by the Ford Motor Company, the usual wheels of this tractor being replaced for the purpose of my invention with front steering wheels 2 and rear driving wheels 3 of the disk type having rubber tires 4. According to my invention, I secure to the rear end of this tractor an auxiliary body 5 having combined supporting and steering wheels 6 which also have rubber tires 7. The connection of the auxiliary body 5 with the tractor is effected through the medium of a rectangular frame 8 secured at its rear end to the forward side of the body 5, as indicated at 9 in Figure 3, and being inclined downwardly therefrom in a forward direction. The frame 8 has side bars 10 (Figures 2 and 3) projecting a considerable distance from its forward end which, at their outer ends, are enlarged to partially embrace the rear axle 11 of the tractor, and are clamped thereto by means of clamp-plates 12 having bolts 13 passed therethrough and through suitable apertures in the enlarged ends of the bars 10, as indicated more particularly in Figure 3. Any other manner of securing the bars 10 to the axle 11 could, of course, be used. The body 5 is provided on its upper side with a table or fifth wheel 14 which, on its rear side, is provided with an enlarged inclined opening 15 leading to a slot 16, which construction is designed to enable a headed stud 17 (Figure 3) provided on the underside of the forward part of a body of a semi-trailer 18 to be received and guided to position in the end of slot 16 when the body 5 is backed under the forward end of the semi-trailer. The fifth wheel 14 is yieldingly mounted on the body 5 through the medium of buffer springs 19, and a suitable locking member 20 is mounted on its underside to engage about the stud 17 when the latter has reached the end of slot 16. The construction and operation of the fifth wheel 14 is not novel per se and is only briefly referred to to enable the general operation of my invention to be understood.

The semi-trailer with which my invention is designed to co-operate and the forward part of which is shown by dotted lines in Figure 3 is a vehicle of a well known type, comprising a body mounted on two wheels and having mounted near its front end a pair of supporting wheels which are adapted to be lowered to rest on the ground and support the front end of the truck or trailer when at rest, and to be raised out of contact with the ground when the trailer is connected to the rear end of a motor driven truck or other motor driven body, to be transported. The front cross-bar 21 of the frame 8 (Figures 2, 3 and 7) has bolted to it at either of its ends, as indicated at 22, a semi-circular brace member 23, the rounded side of which projects considerably below the cross-bar 21. Bolted at their upper ends to the opposite sides of the cross-bar 21, as indicated at 24, are two plates 25 and 26 (Figures 3 and 7) which embrace the brace member 23 and are bolted thereto by a cross-bolt 27. The rear plate 25 is provided with an offset 28 at its lower end, and the bottom end of plate 26 is slightly bent outward to extend parallel with the offset portion, as shown in Figure 3, this construction providing a space for the reception of a pivot bar 29, which is pivotally mounted in the lower ends of the plate 25 by a bolt 30. The outer ends of the pivot bar 29 are apertured to receive the ends of two radius rods 31, which are secured in position by means of nuts 32 applied to their ends and bearing against the rear side of the pivot bar. These radius rods project rearwardly from the pivot bar 29 under the frame 8 and the body 5 and are connected at their rear ends, as indicated at 33 (Figures 2 and 4), to the axle 34 of the auxiliary body 5. This axle is rockingly mounted on a bolt 34ª passing through downwardly-projecting lugs 34ᵇ at the center of body 5. By mounting the forward ends of the radius rods 31 in the pivot bar 29, a slight relative movement between the radius rods is provided to compensate for torsional movements of the auxiliary body 5 and the frame 8 induced by different elevations of and strains upon the two wheels 6 of the auxiliary body, encountered in road service. Due to the fact that when the auxiliary body 5 is secured to the semi-trailer in the manner stated, the wheels 6 in effect become the front wheels of the semi-trailer, it becomes necessary, or at least highly desirable, to provide for turning the wheels 6 of the auxiliary body in order that proper steering and guiding may be effected. To this end, I provide the following mechanism:

Referring to Figures 2, 3 and 5, the numeral 35 indicates a connecting rod which is connected at its forward end by means of a knuckle joint 36 with the inner end of the steering bar 37 of the tractor, the knuckle joint connection being supported by means of a hanger 38, pivotally mounted on the frame of the tractor. The steering bar 37 of the tractor is actuated in the usual way by turning the steering wheel 39 to turn the wheels 2 laterally in one direction or the other. The connecting rod 35 is connected at its inner end by a ball and socket joint 40 (Figure 6) with the end of a steering bar 41, the inner end of which is connected by a ball and socket joint 42 (Figure 4) with a steering knuckle 43, which is pivotally connected by a rod 44 with a similar steering knuckle 45, operatively connected with the steering wheels 6. The steering bar 41 has a turn buckle 46 (Figure 2) interposed in its length for adjusting the length of said bar, and the connecting rod 44 has a similar turn buckle 47 interposed in its length for adjustment purposes, the provision of these turn buckles permitting the lengths of the steering bar 41 and connecting rod 44 to be adjusted to secure the proper alinement of the wheels 6. The inner end of the connecting rod 35 and the kunckle joint connection 40 are supported from the cross-bar 21 of frame 8 through the medium of a hook 48 secured on the underside of cross-bar 21 and a hanger 49 (Figures 3, 6 and 7) having an eye 50 at its upper end engaging over the hook 48 and provided at its lower end with a hook 51, engaging through an eye 52 secured on the upper side of the connecting rod 35. The inner end of the steering bar 41 (Figures 6 and 7) is guided in its movement by a link 53, pivotally connected at its outer end to an arm 54, formed integral with and projecting inwardly from the inner end of the steering bar 41, and, at its inner end, being pivotally mounted in a bracket 55 (Figure 3), secured on the rear side of the plate 26.

From the above description, it will be seen that when the steering bar 37 is moved backward or forward by the steering wheel 39 to turn the wheels 2, the connection of said steering bar with the steering bar 41 through the medium of the connecting rod 35 will act to correspondingly turn the wheels 6, but in the opposite direction, which is necessary, of course, in order to properly turn the assembled device. In making the connection with the semi-trailer, the body 5 is simply backed under the forward end 18 of the semi-trailer, which is held elevated by its supporting wheels, as will be understood, and in this operation, the slot 15 will act to guide the fifth wheel 14 over the stud 17 until the end of the slot 16 passes into engagement therewith when the locking member 20, which in practice is automatic, engages behind the stud and prevents its withdrawal from the slot. The tractor is then operated in the ordinary way to transport the semi-trailer to its desired destination. Arrived at this point, the supporting wheels of the semi-trailer are lowered, the lock 20 released, and the auxiliary body 5 moved from under the semi-trailer by starting the tractor forward. The latter, with the auxiliary body, can then be driven to another semi-trailer to move it to some destination while the first semi-trailer is being unloaded, if such operation is desired.

While not limited in application, my invention will be found to be especially useful in lumber yards, brick yards, factory yards, and similar plants where materials have to be moved from one part of the yard to the other to be assembled, stored, packed, or the like. In many instances, a tractor of the type referred to could be utilized without changing the character of its wheels; but inasmuch as my device is intended for use for transporting articles from one part of a city to another, or over the highways from one city to another, it is desirable to equip both the tractor and the auxiliary body with rubber tired wheels, as shown and described.

I am aware, of course, that wheeled motors carrying fifth wheels, such as indicated in the drawings by the numeral 14 and especially designed for use with semi-trailers, are known and are now in use. But as in the case of motor trucks, that is, trucks with built-in motors, these wheeled motors are cumbersome and expensive and could not be economically employed in smaller establishments and would not be adapted at all for ordinary yard work, such as above referred to. On the other hand, the tractor which I employ as the motive power is relatively inexpensive, and is quite small and light as compared with the ordinary wheeled motor employed in trucking, while, at the same time, possessing great power and being capable of running at the necessary speed to adapt it for use in hauling trucks or semi-trailers. Its utilization for this purpose is rendered possible by my invention, which, in its essence, will be seen to comprise the securing of an auxiliary wheeled body to the tractor, equipped with means for connection with a semi-trailer, and with the provision of means for steering the wheels of the auxiliary body in unison with the steering wheels of the tractor.

I claim:

1. In combination with a tractor, an auxiliary two-wheeled body connected thereto, and means on said body adapting it for detachable connection with a semi-trailer.

2. In combination with a tractor, an auxiliary body connected thereto having two movable wheels, mechanism for turning said wheels from the steering mechanism of the tractor, and means on said body adapting it for detachable connection with a semi-trailer.

3. In combination with a tractor, an auxiliary body mounted on two movable wheels, a frame secured to said body and having side bars secured to the rear axle of said tractor, means on said body adapting it for detachable connection with a semi-trailer, and means for turning said wheels from the steering mechanism of the tractor.

4. In combination with a tractor, an auxiliary body mounted on two movable wheels, a frame secured to said body and having rigid members secured to the rear axle of said tractor, a fifth wheel mounted on said body and adapted to support and to be detachably connected with the end of a semi-trailer, and mechanism for turning said wheels from the steering mechanism of the tractor.

5. In combination with a tractor, an auxiliary body having two movable wheels, means for connecting said body to the rear axle of the tractor, means on said body adapting it for detachable connection with a semi-trailer, steering mechanism for turning the wheels of said body from the steering mechanism of said tractor comprising a connecting rod connected at one end to the steering bar of the tractor, a steering bar connected at one of its end to the other end of said connecting rod, and steering mechanism on said body for turning its wheels connected with the other end of said latter steering bar.

6. In combination with a tractor, an auxiliary body connected to the rear axle of the tractor and having two movable wheels, means on said body adapting it for detachable connection with a semi-trailer, and means for turning the wheels of said body from the steering mechanism of said tractor comprising a connecting rod pivotally secured at one end to the rear end of the steering bar of the tractor, a steering bar pivotally connected at one end to the other end of said connecting rod, steering mechanism for turning the wheels of said body comprising knuckle levers and a cross-bar connecting the same, a pivotal connection between the other end of the latter steering bar and one of said knuckle levers, means for guiding the end of the latter steering bar connected to said connecting rod, and adjusting devices interposed in the length of said latter steering bar and cross-bar.

7. In combination with a tractor, an auxiliary two-wheeled body, a frame secured to said two-wheeled body and having extensions secured to the rear axle of said tractor, steering mechanism for turning the wheels of said body connected with the steering mechanism of said tractor and operated therefrom, a plate pivotally mounted centrally of its length on said frame, and radius rods secured at their outer ends to the axle of said auxiliary body and connected at their inner ends to the opposite ends of said plate.

In testimony whereof, I have hereunto set my hand.

WILLIAM H. SARGENT.